US010158779B2

(12) United States Patent
Hirasawa

(10) Patent No.: US 10,158,779 B2
(45) Date of Patent: Dec. 18, 2018

(54) IMAGE PROCESSING APPARATUS AND INFORMATION PROCESSING APPARATUS CAPABLE OF DISPLAYING USER-BASED OPTION SETTINGS

(71) Applicant: BROTHER KOGYO KABUSHIKI KAISHA, Nagoya, Aichi (JP)

(72) Inventor: Yoshi Hirasawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/712,923

(22) Filed: Sep. 22, 2017

(65) Prior Publication Data

US 2018/0013900 A1 Jan. 11, 2018

Related U.S. Application Data

(62) Division of application No. 15/074,260, filed on Mar. 18, 2016, now Pat. No. 9,800,752.

(30) Foreign Application Priority Data

Mar. 30, 2015 (JP) ................................. 2015-068991

(51) Int. Cl.
*H04N 1/00* (2006.01)
(52) U.S. Cl.
CPC ....... *H04N 1/0097* (2013.01); *H04N 1/00204* (2013.01); *H04N 1/00411* (2013.01); *H04N 1/00416* (2013.01); *H04N 1/00424* (2013.01); *H04N 1/00832* (2013.01); *H04N 2201/0094* (2013.01)

(58) Field of Classification Search
None
See application file for complete search history.

(56) References Cited

U.S. PATENT DOCUMENTS 8,896,882 B2\* 11/2014 Nakata ..................... H04N 1/04
358/1.15
2006/0212497 A1\* 9/2006 Tomita .............. G06F 17/30011
2008/0072155 A1\* 3/2008 Detweiler ............. G06F 3/0489
715/729

(Continued)

FOREIGN PATENT DOCUMENTS

JP 2012-032882 A 2/2012
JP 2014-056592 A 3/2014

*Primary Examiner* — Miya J Williams
(74) *Attorney, Agent, or Firm* — Scully, Scott, Murphy & Presser, PC

(57) ABSTRACT

An image processing apparatus, including a display, a memory, and a controller, to provide a plurality of functions is provided. The controller controls the display to display one of a first screen, through which one of the plurality of functions is selectable; a second screen, through which one of a plurality of options for the selected function is selectable; and a third screen, through which selection of the one of the plurality of options is indicated. When the controller reads shortcut information that indicates a first option for a selected one of the functions, and when the first option is permitted to the user, the third screen is displayed. When the first option is not permitted to the user, and if there is a second option permitted to the user, the second screen is displayed.

7 Claims, 9 Drawing Sheets

(56) References Cited

U.S. PATENT DOCUMENTS

| | | | |
|---|---|---|---|
| 2008/0199199 A1* | 8/2008 | Kato | G03G 15/5016 399/81 |
| 2010/0212023 A1* | 8/2010 | Asahara | G06F 21/10 726/27 |
| 2010/0235775 A1* | 9/2010 | Sugimoto | H04N 1/00411 715/772 |
| 2011/0080608 A1* | 4/2011 | Do | G06F 3/04883 358/1.15 |
| 2012/0030605 A1 | 2/2012 | Nakanishi | |
| 2013/0077115 A1* | 3/2013 | Ozaki | H04N 1/00225 358/1.13 |
| 2013/0141743 A1 | 6/2013 | Miyazawa et al. | |
| 2013/0162662 A1 | 6/2013 | Miyazaki | |
| 2016/0037006 A1 | 2/2016 | Takai | |
| 2016/0072971 A1* | 3/2016 | Ozaki | H04N 1/00482 358/1.15 |
| 2016/0094738 A1 | 3/2016 | Ono | |

* cited by examiner

341

| USER ID | PASSWORD |
|---|---|
| User1 | 1234 |
| User2 | 5678 |
| User3 | 9012 |
| User4 | 3456 |
| User5 | 7890 |

| USER ID | PERMISSION INFORMATION | | | | | | | |
|---|---|---|---|---|---|---|---|---|
| | COPY | | | FAX | SCAN | | | |
| | MAX SHEET NUMBER | COLOR | MONOCHROME | | FILE | TRANSFER | STORE IN USB | EMAIL |
| User1 | UNLIMITED | 100 | UNLIMITED | P | P | P | P | P |
| User2 | 10 | 10 | 50 | P | P | P | P | P |
| User3 | 10 | N/P | 10 | P | P | P | P | P |
| User4 | N/P | N/P | N/P | P | P | N/P | N/P | P |

FIG. 3

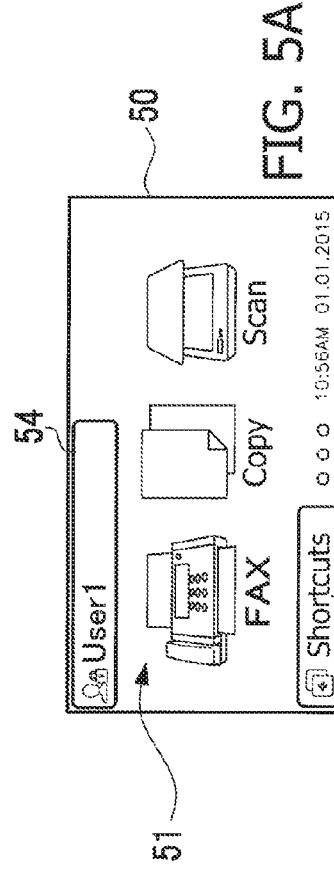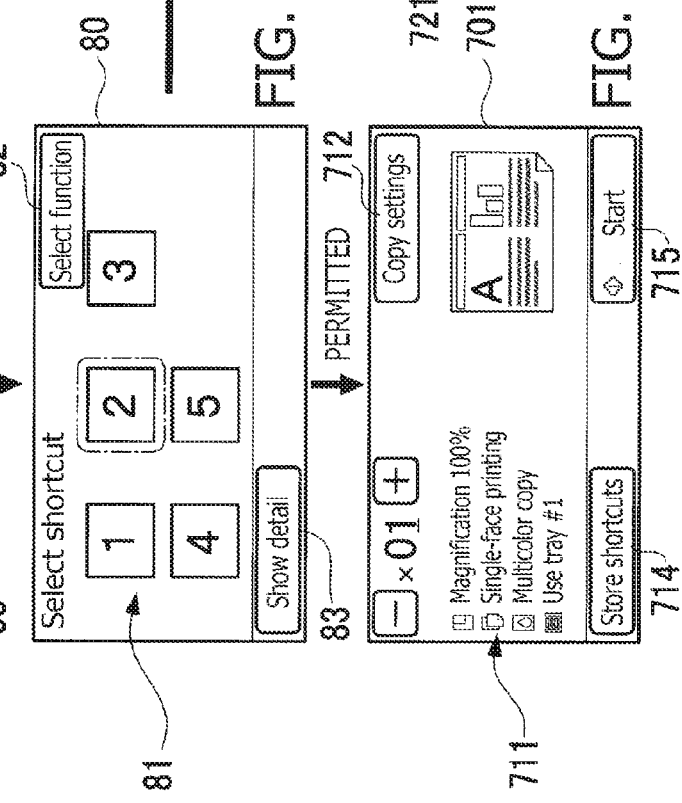

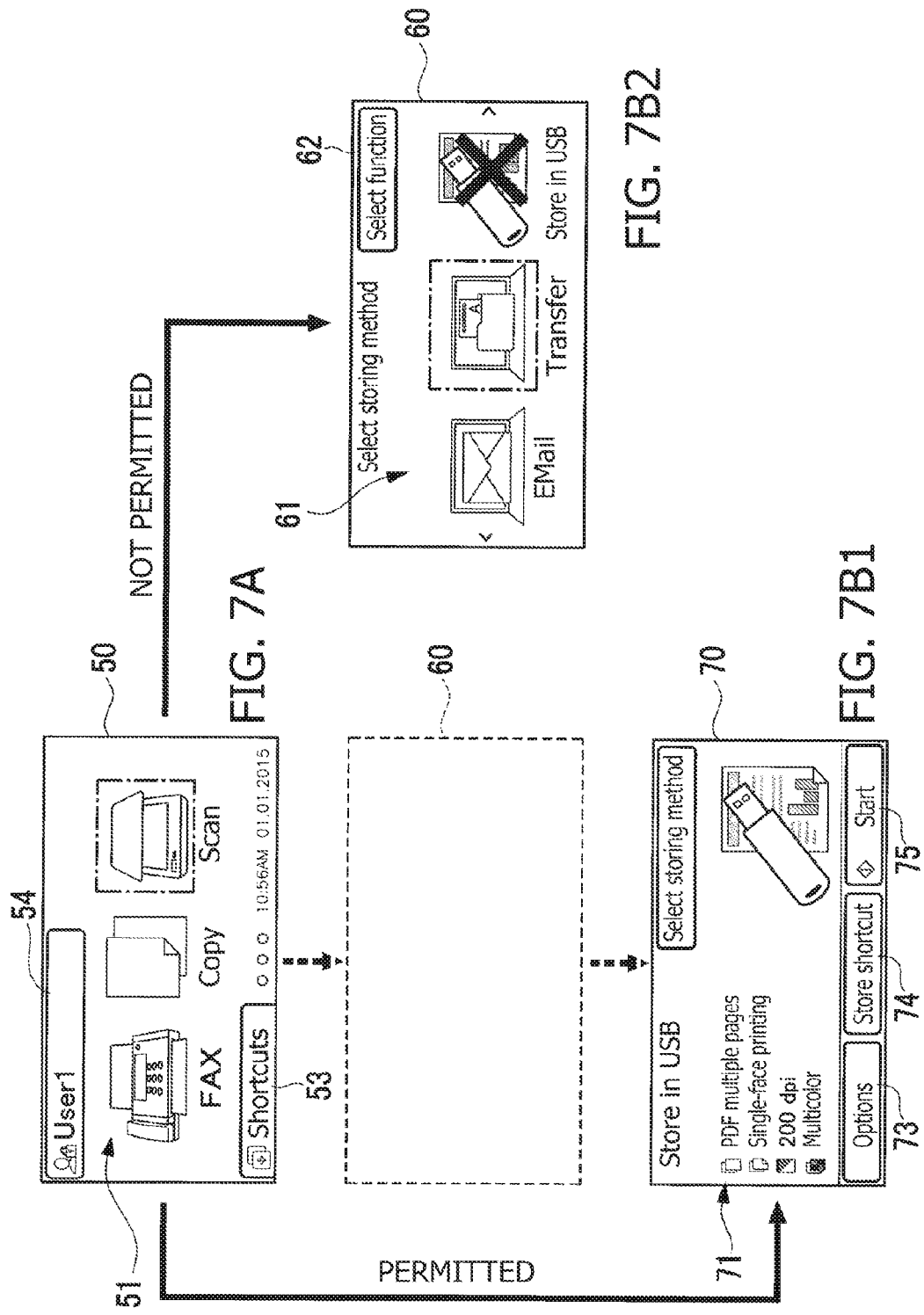

IMAGE PROCESSING APPARATUS AND INFORMATION PROCESSING APPARATUS CAPABLE OF DISPLAYING USER-BASED OPTION SETTINGS

CROSS REFERENCE TO RELATED APPLICATION

This application is a divisional application of U.S. Ser. No. 15/074,260 filed on Mar. 18, 2016 and claims priority from Japanese Patent Application No. 2015-068991, filed on Mar. 30, 2015, the entire subject matter of each of which is incorporated herein by reference.

BACKGROUND

Technical Field

An aspect of the present invention relates to an image processing apparatus and an information processing apparatus, more specifically, to a technic to display a setup screen for an image processing operation in an image or information processing apparatus that may provide the image processing operation restrictively on user basis.

Related Art

An image processing apparatus capable of providing multiple functions or applications to process image data is known. The image processing apparatus may have a list of users, in which the functions permitted or limited to the users are indicated on the user basis, so that the image processing operations may be restrictively provided to the users who log in the image processing apparatus on the user basis.

For example, while the image processing apparatus may provide multiple functions, the image processing apparatus may limit a number of times to execute image processing operations on the user basis. The image processing apparatus may display screens for a current user to input commands to execute the image processing operation or to input setup information concerning options in the image processing operation. While a flow of screen transition to guide the user to start of the image processing operation may take several steps, the image processing apparatus may provide a user interface, by which the flow of screen transition may be modified by the user.

That is, while an image processing apparatus in recent years is equipped with multiple and versatile functions and application programs, a user may be required to take a series of actions correctly each time to input a command to execute a desired image processing operation, and the user may find the series of actions redundant or bothersome. Therefore, at least a part of the information required by the user to execute the application program may be saved in a memory device in the image processing apparatus as so-called shortcut information, and the shortcut information may be used in order to execute the image processing operation so that the user may skip at least a part of the series of input actions. The use of the shortcut information to execute an image processing operation may be called as a shortcut function.

SUMMARY

Meanwhile, even when the image processing apparatus could use the shortcut information, if the function and/or the setups saved for the user as the shortcut information are restricted, and the user has reached the limit of availability of the function and/or the setups: in other words, when the function and/or the setups are no longer permitted to the user, the user may be restricted from using the image processing function. Therefore, in order to execute the image processing operation, the user may need to disable the shortcut function by, for example, selecting not to use the shortcut information or returning to an initial screen when the shortcut information is read from the memory device. In any way, disabling the shortcut function does not reduce the user's actions, and the user may be required to take the series of input actions to execute the image processing operation once again.

The present invention is advantageous in that a technic to reduce a number of user's actions to execute a desired image processing operation in an image processing apparatus, which may provide the image processing operation restrictively on the user basis, is provided.

According to an aspect of the present disclosure, an image processing apparatus capable of providing a plurality of functions is provided. The image processing apparatus includes a display; a memory having a permission information storing area configured to store permission information, in which user-identifying information of a user and permission to use each of a plurality of options related to one of the plurality of functions to the user are associated with each other, and a shortcut information storing area configured to store shortcut information, the shortcut information including information that indicates one of the plurality of options; and a controller. The controller is configured to receive input of the user-identifying information of the user; on condition that the one of the plurality of functions is selected through a first screen, through which any of the plurality of functions is selectable, while the first screen is being displayed, controller the display to display a second screen, through which the one of the plurality of options is selectable; on condition that a first option among the plurality of options is selected, control the display to display a third screen, through which the selection of the first option is indicated; read the shortcut information including information that indicates the first option, determine permission for the first option to the user with reference to the permission information associated with the user who is identified by the received user-identifying information, and if the first option is determined to be not permitted to the user, further determine whether a second option among the plurality of options is permitted to the user; and if the first option is determined to be permitted to the user, control the display to display the third screen; and if the first option is determined to be not permitted to the user and the second option is determined to be permitted to the user, control the display to display the second screen.

According to another aspect of the present disclosure, an image processing apparatus capable of providing a plurality of functions is provided. The image processing apparatus includes a display; a memory having a permission information storing area configured to store permission information, in which user-identifying information of a user and permission to use each of a plurality of options related to one of the plurality of functions to the user are associated with each other, and a shortcut information storing area configured to store shortcut information, the shortcut information including information that indicates one of the plurality of options; and a controller. The controller is configured to receive input of the user-identifying information of the user; on condition that the one of the plurality of functions is selected, and that a first option among the plurality of options related to the selected one of the plurality of functions is selected, control the display to display a first setting screen, through which the selection of the first option is indicated; read the shortcut information including information that indicates the first option; determine permission for the first option indicated in the shortcut information to the user with reference to the permission information associated with the user who is identified by the received user-identifying information; and if the first option is determined to be not permitted to the user, further determine whether a second option among the plurality of options is permitted to the user; if the first option is determined to be permitted to the user, control the display to display the first setting screen; and if the first option is determined to be not permitted to the user and the second option is permitted to the user, receive input by the user to select one of accept and refuse the second option; and if the input by the user to accept the second option is entered, control the display to display a second setting screen, through which information indicating the selection of the second option is displayed.

According to still another aspect of the present disclosure, an information processing apparatus capable of providing a plurality of functions is provided. The image processing apparatus includes a display; a network interface configured to connect the information processing apparatus with an image processing apparatus for communication, the information processing apparatus being configured to provide a plurality of functions; a memory having a shortcut information storing area configured to store shortcut information, the shortcut information including information that indicates one of a plurality of options related to one of the plurality of functions provided by the image processing apparatus; and a controller. The controller is configured to receive input of user-identifying information of a user; receive permission information, in which the user-identifying information of the user and permission to use each of the plurality of options related to the one of the plurality of functions to the user are associated with each other from the image processing apparatus through the network interface; on condition that the one of the plurality of functions is selected through a first screen, through which any of the plurality of functions is selectable, while the first screen is being displayed, control the display to display a second screen, through which the one of the plurality of options is selectable; on condition that a first option among the plurality of options is selected, control the display to display a third screen, through which the selection of the first option is indicated; read the shortcut information including information that indicates the first option, determine permission for the first option to the user with reference to the permission information associated with the user who is identified by the received user-identifying information, and if the first option is determined to be not permitted to the user, further determine whether a second option among the plurality of options is permitted to the user; and if the first option is determined to be permitted to the user, control the display to display the third screen; and if the first option is determined to be not permitted to the user and the second option is determined to be permitted to the user, control the display to display the second screen.

According to still another aspect of the present disclosure, an information processing apparatus capable of providing a plurality of functions is provided. The image processing apparatus includes a display; a network interface configured to connect the information processing apparatus with an image processing apparatus for communication, the information processing apparatus being configured to provide a plurality of functions; a memory having a shortcut information storing area configured to store shortcut information, the shortcut information including information that indicates one of the plurality of functions to be executed by the image processing apparatus; and a controller. The controller is configured to receive input of user-identifying information of a user; receive permission information, in which the user-identifying information of the user and permission for each of the plurality of options related to the one of the plurality of functions to the user are associated with each other, from the image processing apparatus through the network interface; on condition that the one of the plurality of functions is selected, and that a first option among the plurality of options related to the selected one of the plurality of functions is selected, control the display to display a first setting screen, through which the selection of the first option is indicated; read the shortcut information including information that indicates a first option; determine permission for the first option indicated in the shortcut information to the user with reference to the permission information associated with the user who is identified by the received user-identifying information; and if the first option is determined to be not permitted to the user, further determine whether a second option among the plurality of options is permitted to the user; if the first option is determined to be permitted to the user, control the display to display the first setting screen; and if the first option is determined to be not permitted to the user and the second option is permitted to the user, receive input by the user to select one of accept and refuse the second option; and if the input by the user to accept the second option is entered, control the display to display a second setting screen, through which information indicating the selection of the second option is displayed.

BRIEF DESCRIPTION OF THE ACCOMPANYING DRAWINGS

FIG. 2 illustrates a user registration table stored in the MFP according to the embodiment of the present disclosure.

FIG. 3 illustrates a user-basis limitation table stored in the MFP according to the embodiment of the present disclosure.

FIGS. 5A-5C2 illustrate transition of screens to be displayed in the operation panel when a shortcut button is pressed in the MFP according to the embodiment of the present disclosure.

Figure 6A:
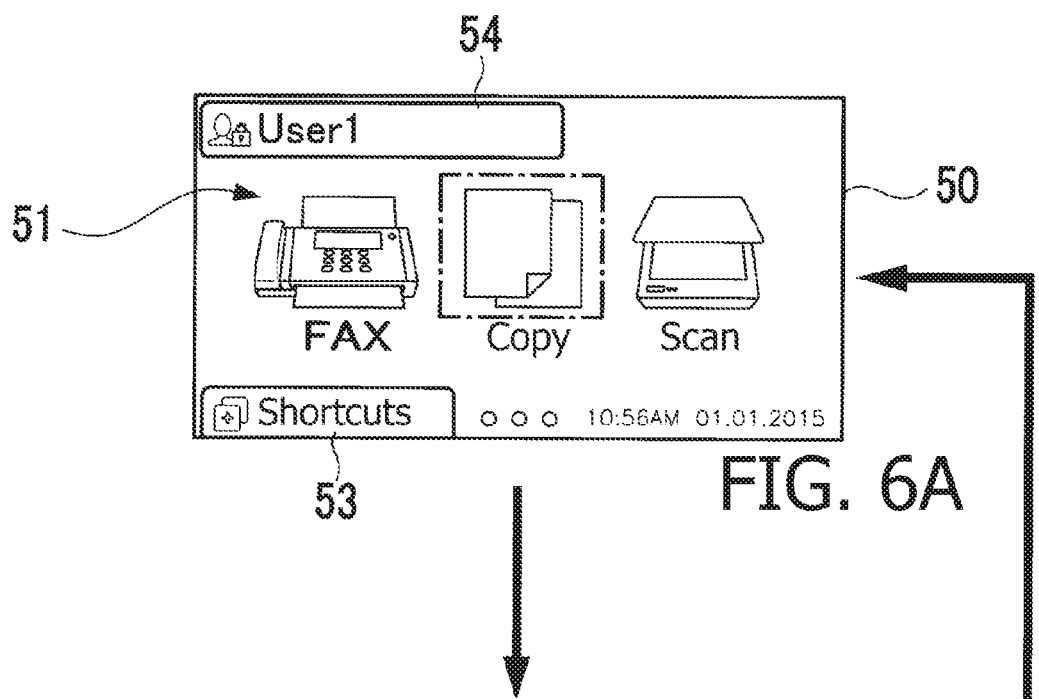
Figure 6B:
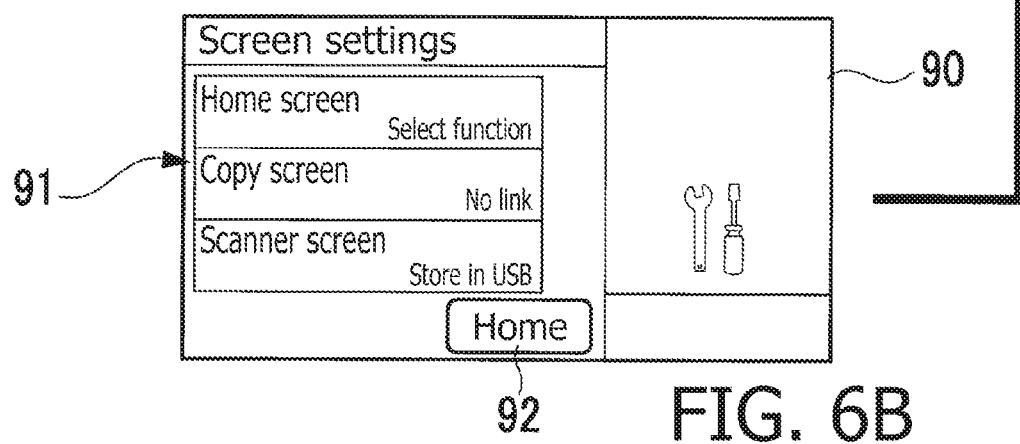

FIGS. 6A-6B are illustrative views of screens, through which the screen-link settings may be established, in the MFP according to the embodiment of the present disclosure.

FIGS. 7A-7B2 illustrate transition of screens to be displayed in the operation panel to execute the scanning operation when the screen-link setting is established in the MFP according to the embodiment of the present disclosure.

Figure 8:
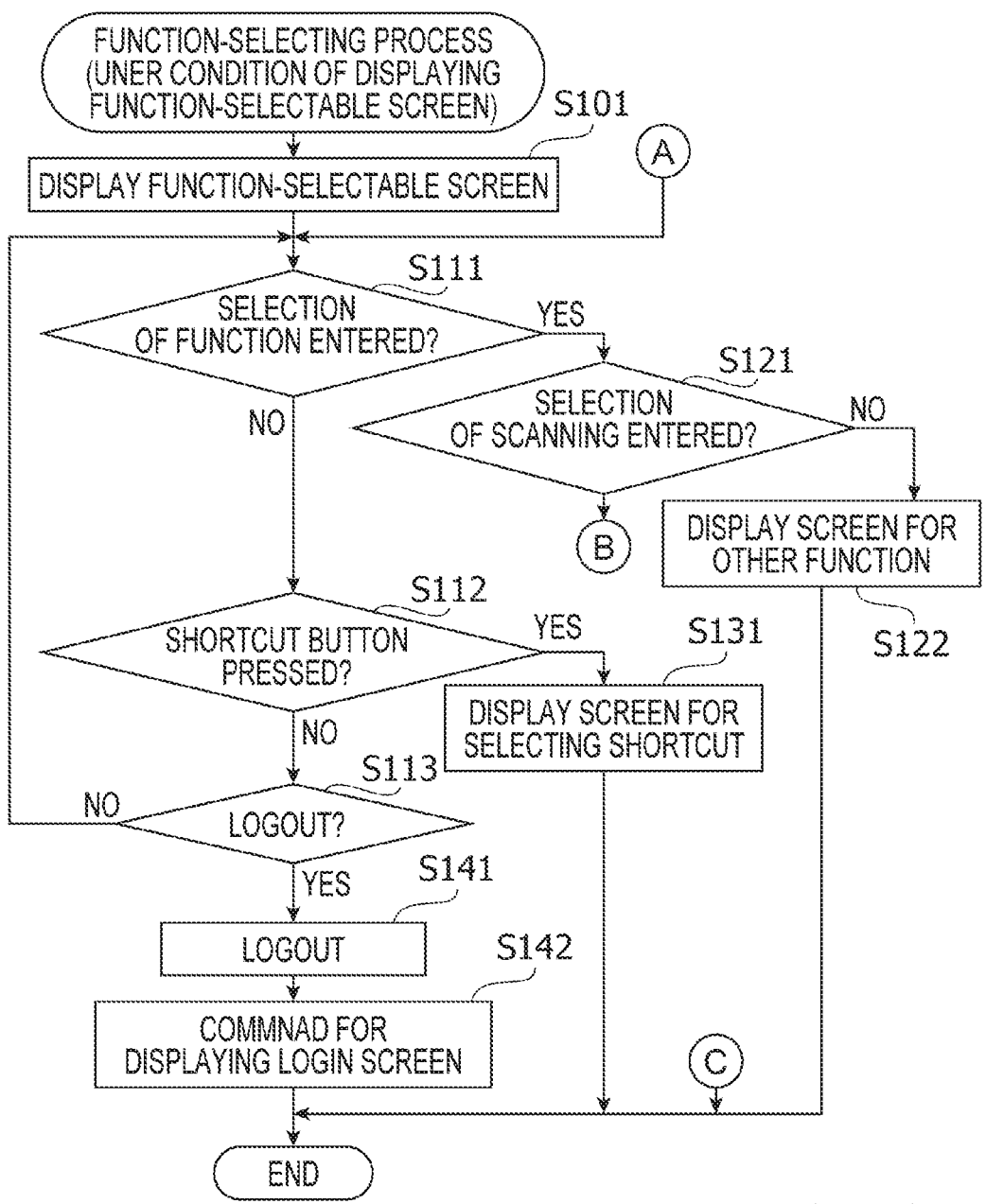

FIG. 8 is a flowchart to illustrate a part of a flow of function-selecting process to be executed in the MFP according to the embodiment of the present disclosure.

Figure 9:
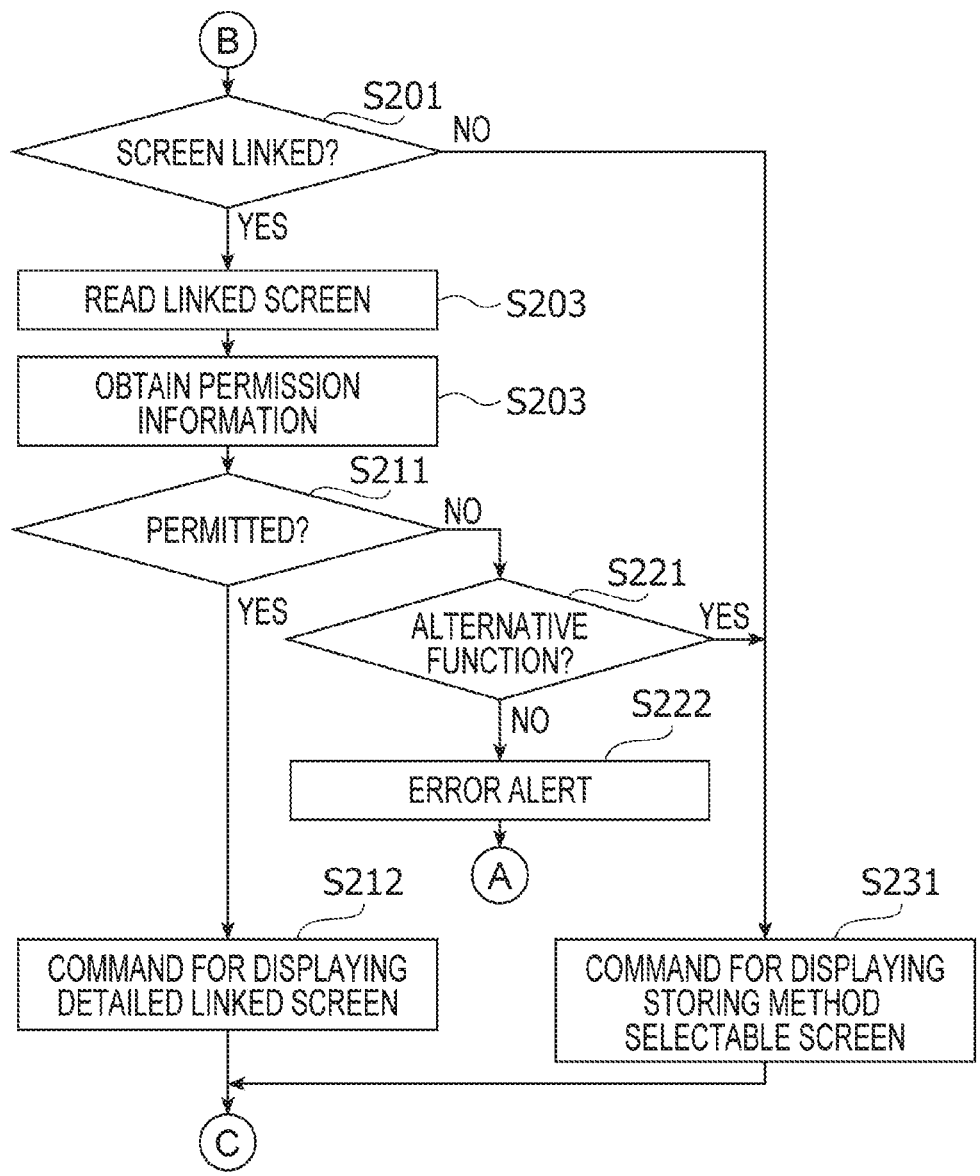

FIG. 9 is a flowchart to illustrate another part of the flow of the function-selecting process to be executed in the MFP according to the embodiment of the present disclosure.

Figure 10:
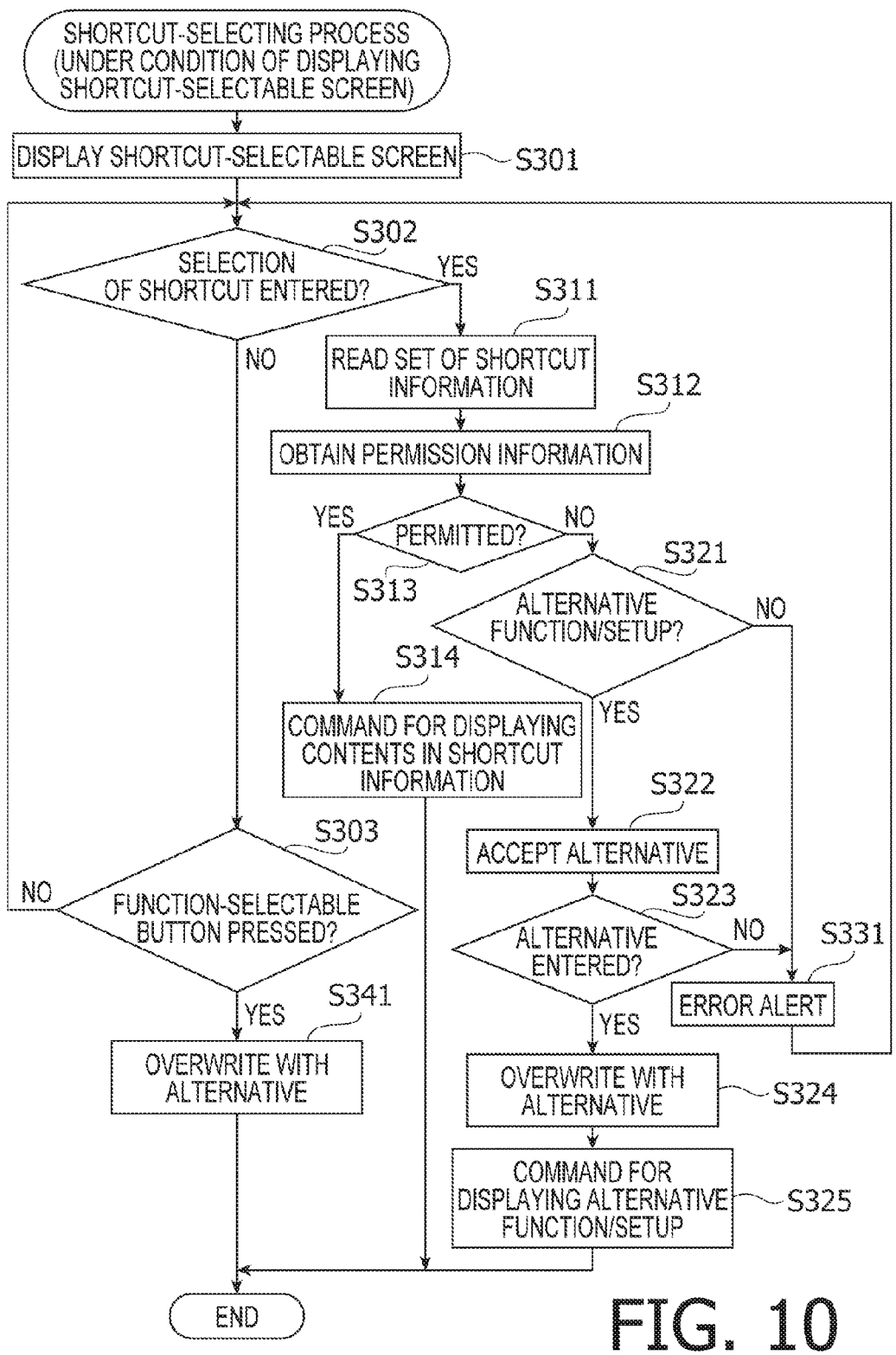

FIG. 10 is a flowchart to illustrate a flow of a shortcut-selecting process to be executed in the MFP according to the embodiment of the present disclosure.

DETAILED DESCRIPTION

Hereinafter, an exemplary configuration of a multifunction peripheral device (MFP) 100 being an image processing apparatus according to an embodiment of the present disclosure will be described with reference to the accompanying drawings.

Figure 1:
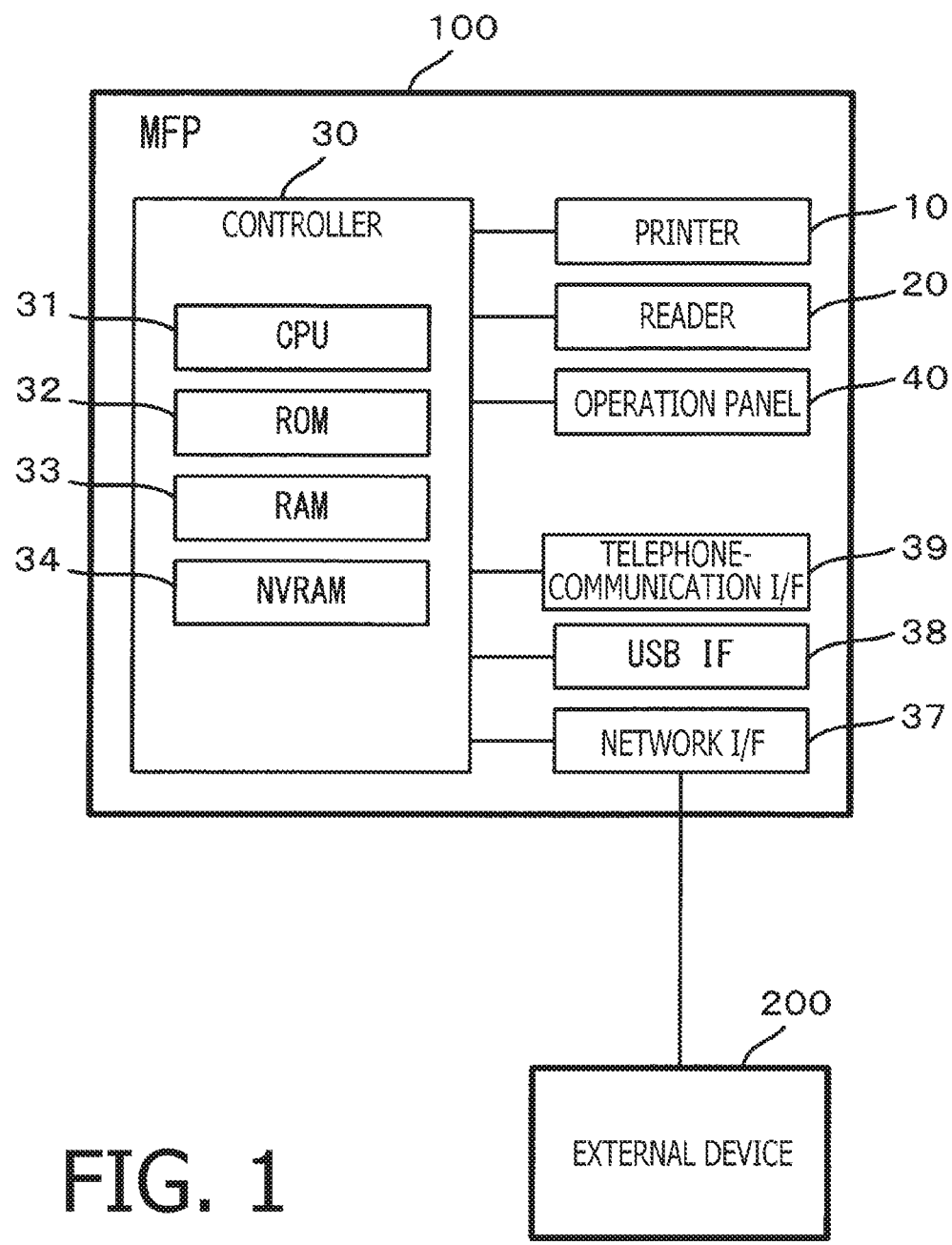
FIG. 1 is a block diagram to illustrate an electrical configuration of a multifunction peripheral device (MFP) according to an embodiment of the present disclosure.

As shown in FIG. 1, the MFP 100 includes a controller 30 having a central processing unit (CPU) 31, a read-only memory (ROM) 32, a random-access memory (RAM) 33, and a non-volatile RAM (NVRAM) 34. The MFP 100 further includes a printer 10, a reader 20, an operation panel 40, a network interface (IF) 37, a universal serial bus (USB) IF 38, and a telephone communication IF 39, which are controlled by the CPU 31. The controller 30 may be a collection of hardware devices, including the CPU 31, which may be used to control behaviors of the MFP 100 and therefore may not necessarily be a single hardware device.

The ROM 32 stores various types of information including firmware programs, which are controlling programs to control the behaviors of the MFP 100, setup information, and initial configuration values. The RAM 33 may be used as a work area, in which the controlling programs are run, and as a memory area, in which data is temporarily stored. The NVRAM 64 may be used as a work area, in which various types of information to be used in the MFP 100 is stored.

The CPU 31 may process the information, stores computation results in the RAM 33 and/or the NVRAM 34, and controls behaviors of parts and components in the MFP 100 according to the controlling programs read from the ROM 32.

The printer 10 may print an image based on the image data on a sheet. The printer 10 may be, for example, an inkjet printer or an electro-photographic printer as long as the printer 10 is capable of printing an image on the sheet. Further, the printer 10 may be a multicolor printer or a monochrome printer.

The reader 20 may read an image on an original document and output image data corresponding to the read image. The reader 20 may be, for example, a contact image scanner (CIS) or a charge-coupled device (CCD), as long as the reader 20 is capable of reading an image. Further, the reader 20 may be a multicolor-readable scanner or a monochrome-readable scanner.

The network interface 37 includes a hardware device to connect the MFP 100 with an external device 200 through a network, which may include, for example, a LAN cable, so that the MFP 100 may communicate with the external device 200. The external device 200 may include, for example, a personal computer (PC), a cloud server, and a smartphone. The USB interface 38 includes a hardware device to connect the MFP 100 with a peripheral device (not shown) through, for example, a USB cable so that the MFP 100 may communicate with the peripheral device. The peripheral device may include, for example, a flash memory and a medium card. The telephone communication interface 39 includes a hardware device to connect the MFP 100 with a communication device, such as a facsimile machine, through a telephone-line communication network so that the MFP 100 may communicate with the communication device.

The operation panel 40 may include buttons, such as, for example, a start key, a stop key, and numerical keys, and a touch panel including a display screen. Through the touch panel and the buttons, information concerning the behaviors of the MFP 100 may be displayed to a user, and the user's commands to the MFP 100 may be entered.

The MFP 100 may provide a plurality of functions including a copying function, a facsimile communication function, and a scanning function. With the copying function, the reader 20 may be controlled to read an image from an original sheet, and the printer 10 may be controlled to print the image on another sheet. With the facsimile communication function, the reader 20 may be controlled to read an image from an original sheet, and image data corresponding to the read image may be transmitted to another facsimile machine through the telephone-communication interface 39. With the scanning function, the reader 20 may be controlled to read an image from an original sheet, and image data corresponding to the read image may be stored in a designated storage device. The user of the MFP 100 may select one of the functions and enter a command to activate the function through the operation panel 40. Meanwhile, functions to be provided by the MFP 100 may not necessarily be limited to these but may include, for example, a printing function, by which the printer 10 is controlled to print an image corresponding to image data obtained from an external device.

The MFP 100 may provide a usage-limiting function, by which usage of the functions provided by the MFP 100 may be permitted or restricted on the user basis. The usage of the functions may further be permitted or restricted on the basis of a function and/or a detailed setup option basis. The MFP 100 may identify and authorize users who use the MFP 100 so that the authorized users may be allowed to use the limited functions and/or limited setup options.

In order to permit or restrict the usage of the functions, the MFP 100 has a user registration table 341 (see FIG. 2), which may be stored in the NVRAM 34. The user registration table 341 may contain records including, for example, but not limited to, two (2) entries concerning a user ID and a password for each user. The entries in the records to be contained in the user registration table 341 may not necessarily limited to user ID and password, as long as the records contain information to identify the users. For example, the records may not necessarily include passwords.

The MFP 100 further has a user-basis limitation table 342 (see FIG. 3) to store information, which may be referred to in order to determine the functions and setup options permitted to the users, on the user basis. The user-basis limitation table 342 may be stored in the NVRAM 34. The user-basis limitation table 342 may contain records including, for example, but not limited to, information concerning the user ID and permission information for each user. Therefore, the user-basis limitation table 342 includes an area for user IDs and an area for permission information. The entries stored in the user ID area in the user-basis limitation table 341 are associated with the user IDs stored in the user registration table 341. The entries stored in the permission information area in the user-basis limitation table 341 indicate permission for the copier function, the facsimile communication function, the scanning function to the users, on the user basis.

More specifically, the permission information area may include an area for copier settings. In the copier setting area, information concerning a maximum count of pages permitted to the user per single job, a quantity of sheets of multicolor copies permitted to the user per day, and a quantity of sheets of monochrome copies permitted to the user per day, may be stored on the user basis.

The counts of multicolor copies and monochrome copies permitted to a user per day may decline by one each time a multicolored copy or a monochrome copy of an image is printed on a sheet for the user and may be initialized every 24 hours. The counts may be initialized by an administrator. When the count indicates zero (0), the user is not permitted to use the multicolor copier or monochrome copier function. An entry "unlimited" indicates that no limit is set to the user. An entry "N/A" indicates the user is not permitted to use the function at all. Thus, the copying function provided by the MFP 100 may include a copying operation, which may require setup of itemized options including multicolor-copying and monochrome-copying. Meanwhile, the permission information contain information that indicates the permission or restriction of each setup option is stored on the user basis. In other words, permission or restriction of each setup option is saved in the user-basis limitation table 342 as the permission information.

The permission information further includes a limitation setting concerning the facsimile transmission function. In the permission information for the facsimile transmission function, permission for the facsimile transmission function to the users is indicated on the user basis. An entry "P" indicates that the facsimile transmission function is permitted to the user, while an entry "N/P" indicates that the facsimile transmission function is not permitted to user at all. Thus, in the facsimile permission information, permission or restriction of the facsimile transmission function for each user is indicated. The facsimile transmission function may not provide any setup option. Therefore, if the facsimile transmission function is not permitted but restricted to the user, there is no setup option concerning the facsimile transmission for the user to select.

The permission information further includes limitation settings concerning the scanning function. When an image is scanned by the reader 20, there may be several methods to store or handle the image data for the scanned image. For example, the MFP 100 may store the image data in a designated file in a storage device, such as the RAM 33 or the NVRAM 34; transfer the image data through the network interface 37 to the external device to be stored therein; store in the USB-enabled device through the USB interface 38; or attach the image data to an e-mail and transmit the e-mail to a designated address. These methods may be herein referred to as "file," "transfer," "store-in-USB," and "e-mail" respectively, and permissions of these methods on the user basis may be indicated in the permission information. Thus, the scanning function provided by the MFP 100 may include a storing operation, which may require setup of itemized options including file, transfer, store-in-USB, and e-mail. Meanwhile, the permission or restriction of each setup concerning the storing operation is saved in the user-basis limitation table 342 as the permission information.

The record structure in the user-basis limitation setting table 341 may not necessarily be limited to those described above but may include different items. Further, the setup options in the permission information may not necessarily be limited to those described above but may include different setup options.

[User Authorization By the MFP]

Next, behaviors of the MFP 100 for authorizing a user will be described below. In the MFP 100, an administrator may register user information with the user registration table 341 in advance to the authorization. Further, the administrator may register the permission information for each user with the user-basis limitation table 342 in advance to the authorization.

In order to activate the MFP 100 to execute an image processing operation, a user should first log in the MFP 100. The user may log in the MFP 100 by entering his/her user ID and a password through a login screen displayed on the operation panel 40. In other words, the MFP 100 should receive input of the user information through the operation panel 40. For example, the MFP 100 may display a list of the user IDs registered with the user registration table 341 on the operation panel 40 so that the user may select one of the displayed user IDs, and after the selection of the user ID, the MFP 100 may prompt the user to enter his/her password. For another example, the user may activate an IC-card reader to read an IC card, in which the user ID is stored, to read the user ID therefrom in order to receive the user ID.

After the entry of the user information, the MFP 100 may authorize the user based on the user information. The MFP 100 may refer to the user registration table 341 (see FIG. 2) to determine whether the user registration table 341 includes a record containing the user ID and the password which are identical to the entered user ID and password. If the record containing the user ID and the password identical to the entered user ID and password is registered, the MFP 100 authorizes the user, and the user successfully logs in. Meanwhile, if no record containing the identical user ID and/or the identical password is registered with the user registration table 341, the MFP 100 does not authorize the user, and the user may fail to log in.

If the user is permitted to log in, the MFP 100 stores the user ID of the permitted user in the RAM 33. Once the user is permitted to log in, the MFP 100 no more displays the log-in screen on the operation panel 40 until the user logs out. Therefore, no other user can login with the MFP 100. In other words, two or more users cannot login with the MFP 100 simultaneously. While the single user logs in, the MFP 100 refers to the user-basis limitation table 342 (see FIG. 3) and obtains the permission information for the current user so that the image processing operation may be provided to the current user within a scope of the permission information.

In this regard, authorization of the user may be performed in a device other than the MFP 100. For example, the MFP 100 may be connected with an authorization server through a network, and the MFP 100 may transmit the entered user information to the authorization server. The authorization server may inspect the transmitted user information and return the authorization result to the MFP 100, and the MFP 100 receiving the authorization result may determine permission or denial of the user's login.

Further, the MFP 100 may obtain the permission information for the current user from an external device. For example, the MFP 100 may be connected with an external server that stores the user-basis limitation table 342 and transmit the entered user ID to the external server, and the external server may return the permission information corresponding to the transmitted user ID to the MFP 100.

[Screen Transition in the Operation Panel of the MFP]

Figure 4A:
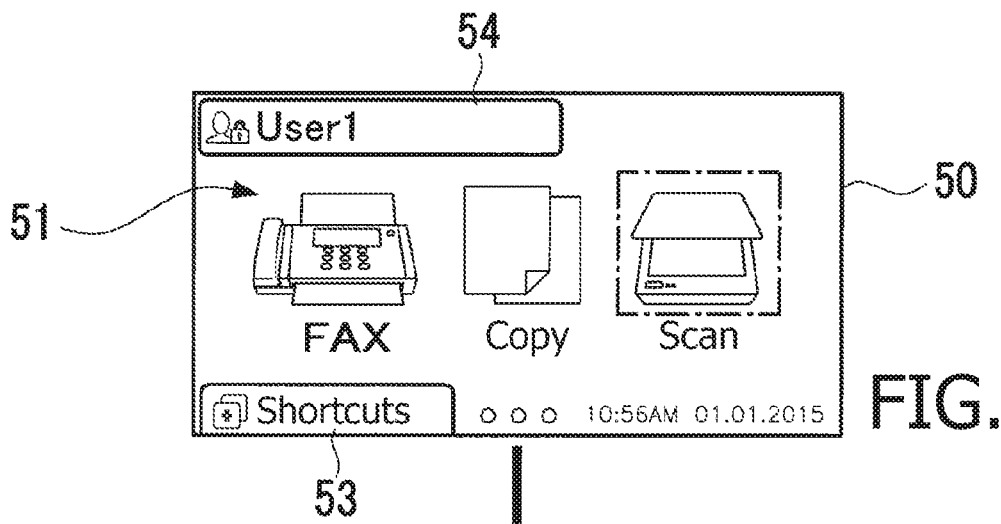
FIGS. 4A-4C illustrate transition of screens to be displayed in an operation panel to execute a scanning operation when no screen-link is set in the MFP according to the embodiment of the present disclosure.

Next, an example of screen transition in the touch-panel of the operation panel 40 in the MFP 100 will be described with reference to FIGS. 4A-7B2. In the following example, screens to be displayed in the operation panel 40 when the currently authorized user attempts to enter a command to start the scanning operation are described.

After the successful login of the current user, the MFP 100 displays a home screen in the operation panel 40. In the present embodiment, a function-selectable screen 50 (see FIG. 4A), through which the user may select one of the functions permitted in the MFP 100, is used as the home screen. Settings of the home screen may be changed through a screen-link setting process, which will be described later. The function-selectable screen 50 may include a function-listing area 51, in which the functions permitted in the MFP 100 are represented in icons; a shortcut button 53, by which the user may proceed to select a shortcut; a user ID area 54, in which the user name is displayed.

In the function-selectable screen 50, a provisionally selected icon representing one of the functions in the MFP 100 is enclosed by a dash-and-dot line. In other words, one of the functions is provisionally selected initially and marked by the enclosing dash-and-dot square. When the dash-and-dot enclosed icon representing the provisionally-selected function is touched by the user, the MFP 100 recognizes that the user selected the function represented by the touched icon and accepts the selection. Meanwhile, if the user touches an icon which is not enclosed by the dash-and-dot square, the MFP 100 recognizes that the user now provisionally selected the touched icon and deletes the initial dash-and-dot square so that the initial provisional selection is canceled.

Figure 4B:
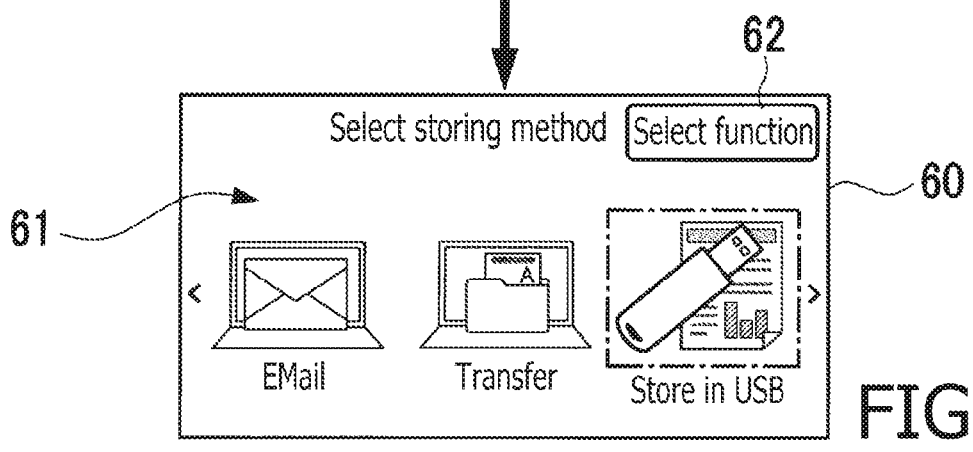

For example, when the icon representing the scanning function is selected through the function-selectable screen 50, the MFP 100 displays a storing method selectable screen 60 (see FIG. 4B), through which the user may select a method to store the scanned image data. The storing method selectable screen 60 may include a method-listing area 61, in which options of storing methods are represented in icons; and a function-selectable button 62, by which the display may return to the function-selectable screen 50. The method-listing area 61 may be scrolled horizontally by the user's touch so that more icons representing more storing options may be displayed.

In the storing method selectable screen 60, similarly to the function-selectable screen 50, a provisionally selected icon representing one of the storing options may be enclosed by a dash-and-dot square. When the dash-and-dot enclosed icon representing the provisionally-selected storing method is touched by the user, the MFP 100 accepts the selected storing method.

Figure 4C:
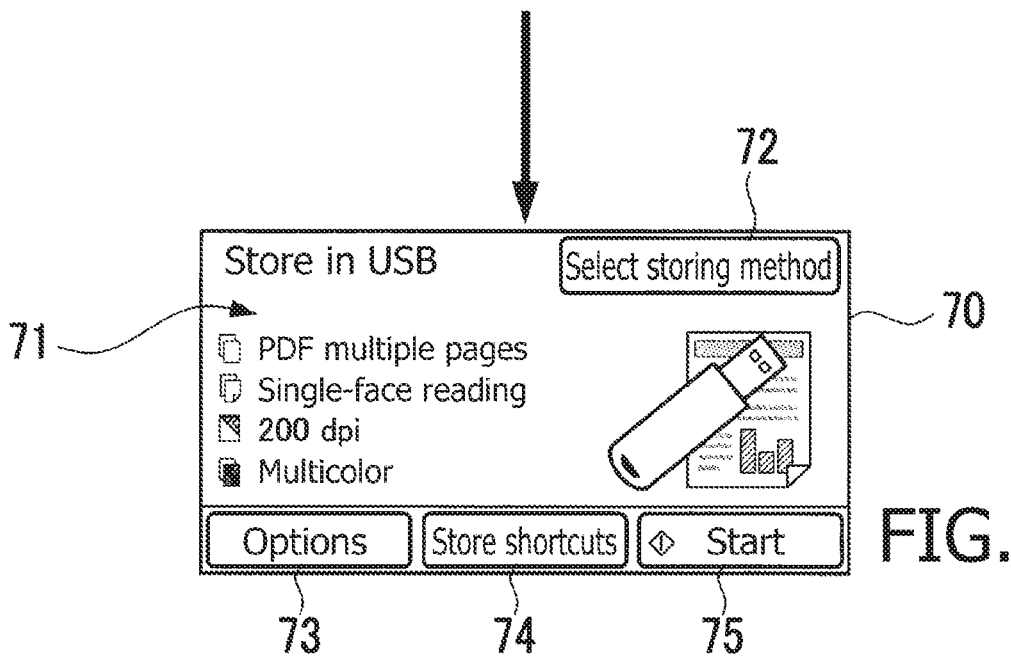

For example, when the selection of "store-in-USB" setup option is entered through the storing method selectable screen 60, the MFP 100 displays a store-in-USB screen 70 (see FIG. 4C), in which detailed setup options to store the image data in the USB device are presented. The store-in-USB screen 70 may include an item-listing area 71, in which current setup among the setup options for storing the image data in the USB device are listed; a storing method selectable button 72, by which the display may return to the storing method selectable screen 60; an option button 73, by which the user may proceed to a screen to set other options or preferences than the storing methods; a shortcut storing button 74, by which the current setups may be saved in shortcut information; and a start button 75, by which a command to start a scanning operation may be entered.

When the start button 75 is touched by the user, the MFP 100 starts the scanning operation according to the scanner settings indicated in the screens 50, 60, 70. When the shortcut storing button 74 is touched by the user, the MFP 100 stores shortcut information, containing the setups currently displayed on the store-in-USB screen 70, in the NVRAM 34. Thus, the shortcut information may at least contain information that indicates the store-in-USB setup option as the storing method. Moreover, the shortcut information may include information that indicates the setups other than the storing method.

Meanwhile, when another one of the storing methods other than the store-in-USB is selected by the user, the MFP 100 displays a screen corresponding to the selected storing method. When another one of the functions other than the scanning function is selected, the MFP 100 displays a screen corresponding to the selected function.

Next, transition of screens in the operation panel 40 according the shortcut information stored in the NVRAM 34 will be described with reference to FIGS. 5A-5C2. When the shortcut button 53 displayed in the home screen (see FIG. 5A) on the operation panel 40 is touched by the user, the MFP 100 receives a command from the user to use the shortcut information.

As the MFP 100 receives the command to use the shortcut information through the function-selectable screen 50, the MFP 100 displays a shortcut-selectable screen 80 (see FIG. 5B), through which the user is prompted to select a set of shortcut information among a plurality of sets of shortcut information. The shortcut-selectable screen 80 may include a shortcut-listing area 81, in which the sets of shortcut information are represented in icons; a function-selectable button 82, by which the display may return to the function-selectable screen 50; and a show-detail button 83, by which detailed contents in the selected set of shortcut information may be displayed. In the shortcut-selectable screen 80 shown in FIG. 5B, the sets of shortcut information are represented by the icons including numerical figures. Meanwhile, the icons may not necessarily represent the sets of shortcut information by the numerical figures but may represent the shortcut information by other information. For example, if each set of the shortcut information has a name, the set of shortcut information may be represented by the name.

In the shortcut-selectable screen 80, similarly to the function-selectable screen 50, a provisionally selected icon representing one of the sets of shortcut information may be enclosed by a dash-and-dot lined square. When the dash-and-dot enclosed icon representing the provisionally-selected set of shortcut information is touched by the user, the MFP 100 accepts the selected set of shortcut information.

When the MFP 100 receives the selection of the set of shortcut information from the user, the MFP 100 obtains the selected set of shortcut information from the NVRAM 34 to read in the RAM 33. The MFP 100 determines, with reference to the permission information in the user-basis limitation table 342, whether the function and the setups indicated in the shortcut information are permitted to the current user. If the MFP 100 determines that the function and the setups indicated in the selected set of shortcut information are permitted to the user, the MFP 100 displays a screen, which shows the function and the setups contained in the selected set of shortcut information.

For example, a set of shortcut information may indicate the copier function as the function to use, and a magnification rate being 100%; single-face printing; multicolor copy; usage of a first tray; as the setups. When the user selects this set of shortcut information, and the MFP 100 determines that these setups are permitted to the current user, the MFP 100 may display a copy setting screen 701 (see FIG. 5C1) showing the permitted setups. The copy setting screen 701 may include an item listing area 711, in which current setups among the setup options for copying an image are listed; a copy setting button 712, by which the display may proceed to a screen to indicate or modify copier setup options; a shortcut storing button 714, by which the current setups may be saved as a set of shortcut information; and a start button 715, by which a command to start a copying operation may be entered.

When the start button 715 is touched by the user, the MFP 100 starts the copying operation according to the copier setups indicated and enabled through the screens 50, 80, 711. When the shortcut storing button 714 is touched by the user, the MFP 100 stores shortcut information, indicating the copier setups currently displayed on the copying setting screen 701, in the NVRAM 34. Thus, the shortcut information may at least contain information that indicates the store-in-USB setup as the storing method. Moreover, the shortcut information may include other information indicating the setups other than the storing method.

Meanwhile, when the function and/or the setups indicated in the selected set of shortcut information are not permitted to the current user, the MFP 100 may determine whether the MFP 100 has an alternative function that may substitute the function not permitted to the user. If the MFP 100 has one or more alternative functions, the MFP 100 may display a screen, through which the user may select one of the alternative functions.

For example, if neither of the setup options of multicolor copier nor monochrome copier is permitted to the current user, but if the facsimile transmission function and the scanner function are permitted to the user, the MFP 100 may determine that the facsimile transmission and scanner functions are permitted to the user as the alternative functions. Therefore, the MFP 100 may display an alternative-selectable screen 720 (see FIG. 5C2), through which the user may select one of the alternative functions. The alternative-selectable screen 720 may include an alternative-listing area 721, in which options for the current user including the alternative functions are listed. The options may include not selecting any alternative function. In other words, the user may refuse to use any of the alternative functions. When one of the alternative functions is selected without refusing, the user may proceed to a screen corresponding to the selected alternative function being enabled. For example, through the alternative-selectable screen 720, if the scanner function is selected, the MFP 100 may display the storing method selectable screen 60 (see FIG. 4B). By using the scanner function in place of the copier function, while the user may not be permitted to print the read image on a sheet, the user may be permitted to output the image data corresponding to the read image and store the image data in a desired storage device. Meanwhile, if the user selects to refuse the alternative functions, the MFP 100 may not change the display but maintain the shortcut-selectable screen 80. Alternatively, the function-selectable screen 50 being the home screen may be displayed.

For another example, if the setup option of multicolor copier is not permitted to the current use, but the setup option of monochrome copier is permitted to the user, the MFP 100 may determine that the setup option of monochrome copier may be provided to the user as the alternative function. Therefore, the MFP 100 may display the alternative-selectable screen, through which the user's selection to use the setup option of monochrome copier may be entered. When the user's selection to use the setup option of monochrome copier is entered, the MFP 100 may display a screen, in which the setup option of multicolor copier is replaced with the setup option of monochrome copier in the item-listing area 711 in the copying setting screen 701 (see FIG. 5C1).

For another example, if the quantities of sheets permitted to the user for multicolor copier and monochrome copier are one (1) and 100 respectively, and the user attempts to make 10 sets of multicolor copies, the user may not be allowed to make 10 sets of multicolor copies. However, the MFP 100 may determine that the MFP 100 provide another setup options that may substitute the setup option not permitted to the user. Therefore, the MFP 100 may display an alternative-selectable screen, through which the user may select one of the alternative setups, so that the user may alternatively select the monochrome copier or may change the quantity of sets of copies to make. If, for example, the selection of monochrome copier is entered through the alternative-selectable screen, the MFP 100 may display a screen, in which the setup option of multicolor copier is replaced with the setup option of monochrome copier in the item-listing area 711 in the copying setting screen 701 (see FIG. 5C1). For another example, if the user selects to change the quantity of sets of copies to make, and the selection is entered, the MFP 100 may display a screen, in which the quantity of sets of copies is changed.

Next, an example of screen transition in the touch-panel of operation panel 40 will be described with reference to FIGS. 6A-6B. The MFP 100 may receive a command from the user to change screen-link settings when the user presses a predetermined button in the operation panel 40.

For example, the MFP 100 may receive the command to change the screen-link settings when the function-selectable screen 50 (see FIG. 6A) is displayed. In response to the command, the MFP 100 may display a screen-link setup display 90 (see FIG. 6B), through which a linkage or a display sequence between two or more screens may be changed. The screen-link setup screen 90 may include a screen-listing area 91, in which the screens to be linked with another screens are listed; and a home button 92, by which the display may return to the home screen. The items in the screen-listing area 91 may include a home screen, a copier screen, and a scanner screen. The home screen refers to the initial screen which may be displayed directly after the user successfully logs in the MFP 100. The copier screen and the scanner screen refer to the screens, which may be displayed after entry of the selection from the user to select the copier function and the scanner function respectively through the function-selectable screen 50. For example, the scanner screen may be linked to one of the storing methods through the screen-setting screen 90, and when the user selects the scanning function through the function-selectable screen 50, a screen associated with the linked storing method may be displayed. The link setups for the screens may be stored in the NVRAM 34. The information to be stored in the NVRAM 34 as the screen-link settings should include information to identify the screen which is to be displayed after the function-selectable screen 50 and may include, for example, information to identify the indicated setup (e.g., store-in-USB), or information to identify the screen (e.g., the store-in-USB screen 70).

For example, through the screen-link setup screen 90 (see FIG. 6B), the store-in-USB screen 70 may be linked with the scanner screen. With this link setup, when the selection of the scanning function is entered through the function-selectable screen 50 (see FIG. 7A), the MFP 100 determines whether the store-in-USB setup option corresponding to the store-in-USB screen 70 is permitted to the current user. If the store-in-USB setup is permitted to the current user, the MFP 100 displays the store-in-USB screen 70 (see FIG. 7B1). In other words, the store-in-USB setup has been indicated along with the scanning function since the screen-link was set through the screen-link setup screen 80. Therefore, at the time when the scanning function is selected through the function-selectable screen 50, the MFP 100 may skip the storing method selectable screen 60 (see FIG. 4B) and directly display the store-in-USB screen 70 (FIG. 7B1). In this regard, the screen-link setting may provide a shortcut, and the information concerning the screen-link setting stored in the NVRAM 34 may be used as the shortcut information.

Meanwhile, if the store-in-USB setup option is not permitted to the current user, the MFP 100 may display the storing method selectable screen 60 (see FIG. 7B2). At this point, the user has selected the scanning function through the function-selectable screen 50; therefore, it is not necessary that the display returns to the function-selectable screen 50, and the MFP 100 may proceed to display the storing method selectable screen 60 (see FIG. 7B2), which is the screen corresponding to the selection of the scanning function through the function-selectable screen 50. Thus, the display does not return to the function-selectable screen 50 being the home screen but proceeds to the storing method selectable screen 60, which is on an upper layer than the store-in-USB screen 70 and on a lower layer than the function-selectable screen 50 being the home screen within the flow of screen transition shown in FIGS. 4A-4C.

In this regard, while the store-in-USB setup option among the plurality of storing methods is not permitted to the user, the MFP 100 may indicate the restriction for the store-in-USB setup option to the user through the storing method selectable screen 60. For example, as shown in FIG. 7B2, the icon representing the store-in-USB setup option may be crossed out by an X. For another example, the icon may be grayed out, or the icon may not be displayed in the storing method selectable screen 60. For another example, a message to inform the user that the store-in-USB setup option is not permitted to the user may be displayed in the storing method selectable screen 60. With this explicit message, troubles, in which the user may misunderstand that the store-in-USB setup option is permitted, may be reduced. Meanwhile, if there are more storing options that are not permitted but restricted to the user, restriction or unavailability of those storing options may be explicitly displayed.

When a storing method other than the store-in-USB setup option is selected, the MFP 100 may display a screen corresponding to the selected storing method. Thereafter, when a command to start an operation corresponding to the selected function through the screen, the MFP 100 may switch the screen-link setting to the selected storing method.

[Function-Selecting Process in the MFP]

Next, a function-selecting process to carry out the screen transition in the operation panel 40 of the MFP 100 will be described below with reference to FIGS. 8 and 9. The function-selecting process may be executed by the CPU 31 after the user successfully logs in the MFP 100 and when a condition to display the function-selectable screen 50 is satisfied. As mentioned above, the function-selectable screen 50 is used as the home screen.

As the function-selecting process starts, as shown in FIG. 8, in S101, the CPU 31 controls the operation panel 40 to display the function-selectable screen 50. In S101, the CPU 31 may refer to the user-basis limitation table 342 and, if the CPU 31 finds there is a function that is not permitted and restricted to the user, the CPU 31 may indicate unavailability of the restricted function.

Following S101, in S111, the CPU 31 determines whether the user's selection of a function is entered. If no selection of function is entered (S111: NO), in S112, the CPU 31 determines whether the shortcut button S3 is pressed. If the shortcut button S3 is not pressed (S112: NO), in S113, the CPU 31 determines whether a command to log out from the MFP 100 is entered. If no command to log out is entered (S113: NO), the CPU 31 returns to S111 and waits for the user's input. The user's input may include, for example, selection of a function from the setup options shown in the function-listing area 51, pressing the shortcut button S3, and the command to log out; however, detailed explanation of these is herein omitted.

In S111, when the user's selection of a function is entered (S111: YES), in S121, the CPU 31 determines whether the selected function is the scanning function. If the scanning function is not selected (S121: NO), in S122, the CPU 31 outputs a command to control the operation panel 40 to display a screen corresponding to a function other than the scanner function. When the command is output, the CPU 31 starts executing a process to control the operation panel 40 to display the screen corresponding to the selected function. In other words, when the copier function or the facsimile transmission function is selected, in S122, the CPU 31 determines permission for the function to the user and displays the screen depending on the determination according to the screen setting, if any, indicated through the screen-link setup screen 90 (see FIG. 6B). In this regard, the screens may transit from one to another similarly to the case, in which the scanning function is selected. However, description of the screen transition concerning the other functions than the scanner function is herein omitted. Following S122, the function-selectable screen 50 in the operation panel 40 is switched to the screen corresponding to the selected function. The function-selecting process ends thereat.

In S121, if the scanning function is selected (S121: YES), the CPU 31 proceeds to S201 in FIG. 9. In S201, the CPU 31 determines whether any screen-link setting has been made with the scanning function. If no screen-link setting has been made (S201: NO), in S231, the CPU 31 outputs a command to control the operation panel 40 to display the storing method selectable screen 60. When the command is output, the CPU 31 starts executing a process to display the storing method selectable screen 60 on the operation panel 40. Detailed description of the process to display the storing method selectable screen 60 on the operation panel 40 is herein omitted.

In S201, if any screen-link setting has been made (S201: YES), in S202, the CPU 31 reads and obtains the screen-link setting from the NVRAM 34. Further, in S203, the CPU 31 refers to the user-basis limitation table 342 and obtains the permission information of the current user. In this regard, S202 and S203 may be conducted in an inverted order.

Thereafter, in S211, the CPU 31 determines whether the storing method indicated in the screen-link settings is permitted to the current user. If the storing method is permitted to the current user (S211: YES), in S212, the CPU 31 outputs a command to control the operation panel 40 to display a screen, e.g., the store-in-USB screen 70, which presents detailed setups concerning the storing method indicated in the screen-link setting. When the command is output, the CPU 31 starts executing a process to control the operation panel 40 to display the screen. Detailed description of the process to display the screen which presents setup options concerning the indicated storing method on the operation panel 40 is herein omitted.

If the indicated storing method is not permitted to the current user (S211: NO), in S221, the CPU 31 determines whether there is another storing method other than the storing method indicated in the screen-link setting is permitted to the user, i.e., whether there is an alternative storing method is determined. If there is an alternative storing method (S221: YES), in S231, the CPU 31 outputs a command to control the operation panel 40 to display the storing method selective screen 60, which is on the upper layer than the screen indicated in the screen-link settings and on the lower layer than the function-selectable screen 50 being the home screen within the flow of screen transition shown in FIGS. 4A-4C. In S231, the storing method selectable screen 60 should display that the storing method indicated in the screen-link setting is not permitted.

When a condition, wherein the storing method indicated in the screen-link setting is not permitted to the current user (S211: NO) but there is an alternative storing method permitted to the user (S221: YES), is satisfied, for example, the screen-link setting may be cleared when the storing method selectable screen 60 is displayed after S231: that is, the storing method selectable screen 60 may be displayed regardless of the screen-link setting indicated in the screen-link setup screen. For another example, when the condition (S211: NO) and (S221: YES) is satisfied, and when the user selects an alternative storing method in response to the storing method selectable screen 60 being displayed, the CPU 31 sets a screen corresponding to the selected alternative storing method as the linked screen. For another example, when the user selects an alternative storing method, the CPU 31 may display a screen in response to the selection; and when the user's command to execute the alternative storing method is entered, the CPU 31 may set a screen corresponding to the selected alternative storing method as the linked screen.

In S221, if there is no alternative storing method (S221: NO), in S222, the CPU 31 alerts the user that the storing method corresponding to the linked screen indicated in the screen-link setting is not permitted to the user. The alert may include a text message, which may be displayed in the touch panel of the operation panel 40, and an audio message.

Following S222, the CPU 31 returns to FIG. 8, and in S111, the CPU 31 waits for the user's input. While the CPU 31 waits for the user's input, the screen on the operation panel 40 may or may not be switched. For example, the screen-link setup screen 90 may be displayed so that the user may change the screen-link setting through the screen-link setup screen 90. Meanwhile, following S212 or S231, the CPU 31 controls the operation panel 40 to switch the screens from the function-selectable screen 50 to another screen. The function-selecting process ends thereat.

In S112, when the shortcut button S3 is pressed (S112: YES), in S131, the CPU 31 outputs a command to control the operation panel 40 to display the shortcut-selectable screen 80. Following the output of the command, the CPU 31 starts controlling the operation panel 40 to display the shortcut-selectable screen 80. Following S131, the display in the operation panel 40 is switched from the function-selectable screen 50 to the shortcut-selectable screen 80. The function-selecting process ends thereat. Meanwhile, when one of the shortcut icons is selected through the shortcut-selectable screen 50, the CPU 31 determines permission for the function to the user and displays the screen depending on the determination.

Following S112, in S113, when a command for logout is entered (S113: YES), in S141, the CPU 31 is released from the user. In S142, the CPU 31 outputs a command to control the operation panel 40 to display a login screen, through which information for a user to log in is displayed and the user's command for log in may be entered. Following the output of the command, the CPU 31 starts controlling the operation panel 40 to display the login screen. Detailed description of a process to control the operation panel 40 to display the login screen on the operation panel 40 is herein omitted. Following S142, the display in the operation panel 40 is switched from the function-selectable screen 50 to the login screen. The function-selecting process ends thereat.

[Shortcut-Selecting Process in the MFP]

Next, a shortcut-selecting process to carry out the screen transition in the operation panel 40 will be described below with reference to FIG. 10. The shortcut-selecting process may be executed by the CPU 31 when a condition to display the shortcut-selectable screen 80 (see FIG. 5B) is satisfied, e.g., when the shortcut button S3 in the function-selectable screen 50 is pressed.

As the shortcut-selecting process starts, in S301, the CPU 31 controls the operation panel 40 to display the shortcut-selectable screen 80. In this regard, the shortcut information to be displayed on the shortcut-selectable screen 80 does not include the information in the screen-link setting.

Following S301, in S302, the CPU 31 determines whether selection of a set of shortcut information from the user is entered. If no selection is entered (S302: NO), in S303, the CPU 31 determines whether the function-selectable button 82 is pressed. If the function-selectable button 82 is not pressed (S303: NO), the CPU 31 returns to S302 and waits for the user's input. The user's input may include, for example, selection of a set of shortcut information from the shortcut-listing area 81, pressing the function-selectable button 82, and pressing the show-detail button 83; however detailed explanation of these is herein omitted.

After entry of the selection of the set of shortcut information (S302: YES), in S311, the CPU 31 obtains the selected set of shortcut information from the NVRAM 34 and reads in the RAM 33. Further, in S312, the CPU 31 refers to the user-basis limitation table 342 and obtains the permission information of the current user. In this regard, S311 and S312 may be conducted in an inverted order.

Thereafter, in S313, the CPU 31 determines whether the function and the setups indicated in the selected set of shortcut information are permitted to the current user. If the function and the setups are permitted to the current user (S313: YES), in S314, the CPU 31 outputs a command to control the operation panel 40 to display a screen, which shows the function and the setups indicated in the selected set of shortcut information. Following S314, the display in the operation panel 40 is switched from the shortcut-selectable screen 80 to the screen showing the function and the setups indicated in the selected set of shortcut information. The shortcut-selecting process ends thereat.

If the function and the setups indicated in the selected set of shortcut information are not permitted to the user (S313: NO), in S321, the CPU 31 determines whether there is another function and/or setup option that may substitute the function not permitted to the current user. If there is an alternative function and/or setup option (S321: YES), in S322, the MFP 100 controls the operation panel 40 to display the alternative-selectable screen 720, through which the user may select one of the alternative functions.

Following S322, in S323, the CPU 31 determines whether an alternative function and/or setup option is entered. If the alternative function and/or setup option is entered (S323: YES), that is, without selecting the option of not selecting any alternative function, when one of the alternative functions is selected, in S324, the CPU 31 replaces the shortcut information entered in S302 and stored in the RAM 33 with the alternative function and setup entered in S323. In S325, the CPU 31 outputs a command to control the operation panel 40 to display the replacing function and the setup. Following S325, the display in the operation panel 40 is switched from the shortcut-selectable screen 80 to a screen, which shows the setup stored as the replacing shortcut information. The shortcut-selecting process ends thereat.

Meanwhile, in S323, if the option of not selecting any alternative function and/or setup option is selected (S323: NO), or there is no alternative function and/or setup option (S323: NO), the CPU 31 alerts the user that the function and/or setup option indicated in the selected set of shortcut information is not permitted to the user. Following S331, the CPU 31 returns to S302 and waits for the user's input. While the CPU 31 waits for the user's input, the screen on the operation panel 40 may or may not be switched. For example, the CPU 31 may not necessarily return to S302 but may proceed to S341 to output a command to control the operation panel 40 to display the function-selectable screen 50. In other words, the CPU 31 may control the operation panel 40 to display the home screen, which was displayed before the operation panel 40 displayed the shortcut-selectable screen 80.

Meanwhile, in S303, if the function-selectable button 82 is pressed (S303: YES), in S341, the CPU 31 outputs a command to control the operation panel 40 to display the function-selectable screen 50. When the command is output, the CPU 31 starts the function-selecting process described earlier. Following S341, the display in the operation panel 40 is switched from the shortcut-selectable screen 80 to the function-selectable screen 50. The shortcut-selecting process ends thereat.

According to the MFP 100 described above, for example, while the store-in-USB setup option is restricted or not permitted to the user, and the scanning function is linked to the store-in-USB setup option in the screen-link setting, when the scanning function is selected through the function-selectable screen 50, that is, when the shortcut information indicating the store-in-USB setup option is read, and if an alternative storing method to substitute the store-in-USB setup option may be permitted to the user, the storing method selectable screen 60 may be displayed. In this regard, the display does not return to the function-selectable screen 50, and the user is not required to designate the scanning function once again through the function-selectable screen 50 and disable the shortcut information. Therefore, compared to a configuration, in which the display returns to the function-selectable screen 50 and the user is required to disable the shortcut information and select the desired function once again, the actions to be taken by the user may be reduced.

Thus, according to the MFP 100, when a function linked to a specific screen and a function and/or setup saved as shortcut information are not permitted to the user, the display does not return to the home screen being the initial screen but proceeds to an intermediate screen between the home screen and the specific screen to provide the function. Therefore, a number of actions to input through the screens by the user may be reduced, and the operation may be easier for the user.

Further, according to the MFP 100, when the setups indicated in the shortcut information are not permitted to the user, and if there is an alternative setup option, the MFP 100 may accept the alternative setup as substitute. When the substitution is entered, a screen corresponding to the alternative setup may be displayed. Therefore, compared to a configuration, in which the display returns to a previous screen to select the alternative setup, a number of actions to input through the screens by the user may be reduced, and the operation may be easier for the user.

Although an example of carrying out the disclosure have been described, those skilled in the art will appreciate that there are numerous variations and permutations of the image processing apparatus and the information processing apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the present disclosure may not necessarily be applied to an MFP but may be applied to various types of image and/or information processing apparatus as long as the apparatus is equipped with functions to process an image and to output image data of the processed image. The image and/or information processing apparatus may include, for example, a printer, a scanner, a facsimile machine, and a copier.

For another example, the user ID and the password may not necessarily be required for the user identification and authorization to login the MFP 100, but solely the user ID may be required so that the user may be identified but not necessarily be authorized.

For another example, permissions for the functions and the setup options may not necessarily be limited on the user basis. For example, a plurality of users as a group may be registered with the user-basis limitation table 342 so that the permissions of the functions and the setup options may be set on the group basis.

For another example, the selections through the function-selectable screen 50, the storing method selectable screen 60, and the shortcut selectable screen 80 may not necessarily be entered after the provisional selection, e.g., by two touches to the icon, but may be directly selected by a single touch.

For another example, the command from the user to change the screen-link settings may not necessarily be entered through the predetermined button in the operation panel 40 but may be entered, for example, by pressing a button which is displayed in a home screen, such as the function-selectable screen 50.

For another example, when no screen-link setting is established, and when the scanning function is selected through the function-selectable screen 50, the display may be switched from the function-selectable screen 50 directly to the storing method selectable screen 60 or indirectly through other intermediate screens to the storing method selectable screen 60. In other words, following the selection of the scanning function through the function-selectable screen 50, intermediate screens between the function-selectable screen 50 and the storing method selectable screen 60 within the order of the screen transition may be displayed. Similarly, when the store-in-USB is selected through the storing method selectable screen 60, the display may be switched directly to the store-in-USB screen 70 or indirectly through intermediate screens to the store-in-USB screen 70. In other words, following the selection of store-in-USB setup, intermediate screens between the storing method selectable screen 60 and the store-in USB screen 70 within the order of the screen transition may be displayed.

For another example, the present disclosure may not necessarily be applied to the method to control the screens to be displayed on the operation panel 40 of the MFP 100 but may be applied to a method to control screens to be displayed by a driver program installed in a personal computer (PC). More specifically, the present disclosure may be applied to a method to control screens to be displayed on a display device of the PC, which may be connected with the MFP 100 and control the behaviors of the MFP 100.

When the present disclosure is applied to an information processing apparatus, such as a PC, each screen may be displayed on an display device of the PC, and the shortcut information may be stored in a memory device in the PC. The information to identify the user may be the information concerning the current user who logged in the PC, and the PC may keep the permission information of the current user in a memory device in the PC. Optionally, the information processing apparatus may obtain the permission information of the current user from the MFP 100 or from a printer server which administrates the MFP 100. Meanwhile, the function-selectable process and the shortcut-selectable process may be conducted by a driver program installed in the information processing apparatus.

The processes and steps described in the above embodiment may be implemented by a single CPU, a plurality of CPUs, a hardware such as an ASIC, and/or a combination of these. The processes and steps described in the above embodiment may be implemented through a recording medium that stores a program and/or a method to perform the processes and the steps.

What is claimed is:

1. An image processing apparatus configured to provide a plurality of functions, comprising:
    a display;
    a memory comprising:
        a permission information storing area configured to store permission information, in which user-identifying information of a user and permission to use each of a plurality of options related to one of the plurality of functions to the user are associated with each other; and
        a shortcut information storing area configured to store shortcut information, the shortcut information including information that indicates one of the plurality of options; and
    a controller configured to:
        receive input of the user-identifying information of the user;
        on condition that the one of the plurality of functions is selected, and that a first option among the plurality of options related to the selected one of the plurality of functions is selected, control the display to display a first setting screen, through which the selection of the first option is indicated;
        read the shortcut information including information that indicates the first option; determine permission for the first option indicated in the shortcut information to the user with reference to the permission information associated with the user who is identified by the received user-identifying information; and if the first option is determined to be not permitted to the user, further determine whether a second option among the plurality of options is permitted to the user;
        if the first option is determined to be permitted to the user, control the display to display the first setting screen; and
        if the first option is determined to be not permitted to the user and the second option is permitted to the user, receive input by the user to select one of accept and refuse the second option; and if the input by the user to accept the second option is entered, control the display to display a second setting screen, through which information indicating the selection of the second option is displayed.

2. The image processing apparatus according to claim 1, wherein the controller is configured to store the shortcut information including information that indicates the second option in the memory when the input by the user to accept the second option is entered.

3. The image processing apparatus according to claim 1, wherein the controller is configured to control the display to display a readout screen, through which a command from the user to read the shortcut information is entered, the readout screen containing buttons, the buttons each being associated with one of sets of the shortcut information stored in the memory; and
    wherein the controller is configured to read a set of the shortcut information including the information that indicates the first option when input by the user through one of the buttons in the readout screen associated with the set of the shortcut information including the information that indicates the first option is entered.

4. The image processing apparatus according to claim 3, wherein, if the input by the user to refuse the second option is entered, the controller is configured to control the display to display the readout screen.

5. The image processing apparatus according to claim 1, wherein the controller is configured to:
    on condition that the one of the plurality of functions is selected through a first screen, through which any of the plurality of functions is selectable, while the first screen is being displayed, control the display to display a second screen, through which any of the plurality of options related to the selected one of the plurality of functions is selectable;
    on condition that the first option among the plurality of options is selected, control the display to display the first setting screen; and
    if the input by the user to refuse the second option is entered, control the display to display the first screen.

6. The image processing apparatus according to claim 5, wherein permission for each of the plurality of functions to the user is associated with the user-identifying information of the user in the permission information;
    wherein, when the controller reads the shortcut information, and if the first option is determined to be permitted to the user, the controller is configured to control the display to display the first setting screen; and
    wherein, when the controller reads the shortcut information, and if the first option is determined to be not permitted to the user, the controller is configured to control the display to display the first screen.

7. An information processing apparatus, comprising:
    a display;
    a network interface configured to connect the information processing apparatus with an image processing apparatus for communication, the image processing apparatus being configured to provide a plurality of functions;
    a memory comprising a shortcut information storing area configured to store shortcut information, the shortcut information including information that indicates one of the plurality of functions to be executed by the image processing apparatus; and
    a controller configured to:
        receive input of user-identifying information of a user;
        receive permission information, in which the user-identifying information of the user and permission for each of the plurality of options related to the one of the plurality of functions to the user are associated with each other, from the image processing apparatus through the network interface;

on condition that the one of the plurality of functions is selected, and that a first option among the plurality of options related to the selected one of the plurality of functions is selected, control the display to display a first setting screen, through which the selection of the first option is indicated;

read the shortcut information including information that indicates a first option; determine permission for the first option indicated in the shortcut information to the user with reference to the permission information associated with the user who is identified by the received user-identifying information; and if the first option is determined to be not permitted to the user, further determine whether a second option among the plurality of options is permitted to the user;

if the first option is determined to be permitted to the user, control the display to display the first setting screen; and if the first option is determined to be not permitted to the user and the second option is permitted to the user, receive input by the user to select one of accept and refuse the second option; and if the input by the user to accept the second option is entered, control the display to display a second setting screen, through which information indicating the selection of the second option is displayed.

* * * * *